US011473707B2

(12) United States Patent
Ackermann et al.

(10) Patent No.: US 11,473,707 B2
(45) Date of Patent: Oct. 18, 2022

(54) LOCKING DEVICE

(71) Applicant: EUGEN FORSCHNER GMBH, Spaichingen (DE)

(72) Inventors: Janosch Ackermann, Spaichingen (DE); Rory Wenzler, Spaichingen (DE); Sander Nikolov Donayre, Spaichingen (DE)

(*) Notice: Subject to any disclaimer, the term of this patent is extended or adjusted under 35 U.S.C. 154(b) by 167 days.

(21) Appl. No.: 16/761,440

(22) PCT Filed: Oct. 18, 2018

(86) PCT No.: PCT/EP2018/078629
§ 371 (c)(1),
(2) Date: May 4, 2020

(87) PCT Pub. No.: WO2019/086265
PCT Pub. Date: May 9, 2019

(65) Prior Publication Data
US 2020/0393070 A1    Dec. 17, 2020

(30) Foreign Application Priority Data

Nov. 3, 2017   (DE) .............................. 102017125683

(51) Int. Cl.
*F16L 37/084* (2006.01)
*F16L 37/088* (2006.01)
*F16L 53/38* (2018.01)

(52) U.S. Cl.
CPC ............. *F16L 37/088* (2013.01); *F16L 53/38* (2018.01)

(58) Field of Classification Search
CPC . F16L 37/084; F16L 37/0841; F16L 37/0847; F16L 37/0848; F16L 37/086; F16L 37/088; F16L 37/0885; F16L 37/098; F16L 37/0985; F16L 37/12; F16L 37/1205; F16L 37/133
USPC ........................ 285/88, 87, 18, 33, 307, 317
See application file for complete search history.

(56) References Cited

U.S. PATENT DOCUMENTS

| 6,881,333 | B2 * | 4/2005 | Ozeki | .................. | B01D 35/143 |
| | | | | | 210/232 |
| 2006/0267341 | A1 | 11/2006 | Takayanagi | | |
| 2010/0276922 | A1 | 11/2010 | Rehder | | |

FOREIGN PATENT DOCUMENTS

| DE | 68917739 T2 | 2/1995 |
| DE | 102014113151 A1 | 5/2016 |
| EP | 2224158 A1 | 9/2010 |

* cited by examiner

*Primary Examiner* — Aaron M Dunwoody
(74) *Attorney, Agent, or Firm* — Albert Bordas, P.A.

(57) ABSTRACT

A locking element (30) for releasably fixing a fluid-conducting plug (40) to a connector (10) that has at least one spring element (311) for a sprung preload into a locking position with at least one trigger element (35) for transferring from a receiving position into the locking position. At least two trigger elements (35) are provided on the locking element (30), wherein for a transfer to the locking position, a simultaneous actuation of the trigger elements (35) is required.

7 Claims, 5 Drawing Sheets

LOCKING DEVICE

BACKGROUND OF THE INVENTION

Description of the Related Art

A locking device is known from DE 10 2014 113 151 A1. This comprises a locking element for automatically coupling and releasably fixing a fluid-conducting plug on a connector. Therein, for easier handling during coupling and decoupling, at least one spring element is provided on the locking element.

SUMMARY OF THE INVENTION

The object of the invention is to provide a locking device having increased actuation safety.

This object is achieved by a locking device comprising a connector (10) and a locking element (30) for releasably fixing a fluid-conducting plug (40) to the connector (10), the locking element (30) having at least one spring element (311) for a sprung preload into a locking position with at least two trigger elements (35) for transferring from a receiving position into the locking position, characterized in that the at least two trigger elements (35) are provided on the locking element (30), the at least two trigger elements (35) are formed by trigger flaps (352) arranged on the locking element (30) in a sprung manner, each of the trigger flaps (352) has at least one trigger tab (353), and in that, for a transfer to the locking position, actuation of all the at least two trigger elements (35) are required, the locking element (30) has at least one clearance (354) for engagement on a latch cam (114) on an inner face (113) of the connector (10), the at least one trigger tab (353) are spring-biased on the locking element (30) in the unlocked state in an axial direction (15), the at least one trigger tab (353) are released in the axial direction (15) when actuated axially, the locking device is triggered by way of the contact a flange (43) located at plug (40) with the trigger flaps (352), as a result, the at least one clearances (354) are lifted off the latch cams (114), the locking element (30) further comprising a vertical limb (32) and a horizontal limb (31), the at least two trigger elements (35) being arranged on the vertical limb (32), and the horizontal limb (31) having the at least one resiliently bent spring element (311), and at least one spring element (36) acting in an axial direction is provided on the vertical limb (32).

The at least one spring element (36) cooperates with a stop (115) on the housing (11), in such a way that the horizontal limb (31) does not protrude beyond an upper edge (112) of the connector (10) in the locking position.

An aperture (33), comprising an extension (331) adapted to the external diameter (D40) of the plug (40), is formed on the vertical limb (32).

The trigger elements (35) protrude into the edge region of the aperture (33) and can be actuated by a flange (43) on the plug (40). The trigger element (35) is separated from the remaining part of the vertical limb (32) or of the horizontal limb (31) by a break (351) that is punched out of the material of the locking element (30).

A latch element (34) is formed on the horizontal limb (31), at the transition to the vertical limb (32), and one trigger element (35), respectively, is formed on either side of the latch element (34).

The trigger tabs (353) of the trigger elements (35) are formed so as to be approximately at right angles to the trigger flaps (352).

By way of the present invention, it is possible to protect the locking element for the fluid-conducting plug on a connector against accidental premature triggering.

One possible field of use of the invention is fixing a fluid-conducting plug on a connector in the automobile sector, in particular a connector for SCR lines (for urea or "AdBlue®").

The present locking device comprising a locking element for releasably fixing a fluid-conducting plug on a connector has at least one spring element for a sprung preload in a locking position with at least two trigger elements. The at least one spring element is provided for transferring the locking element from a receiving position into a locking position. At least two trigger elements are provided on the locking element. For a transfer to the locking position, actuation of all trigger elements is required. By contrast with the prior art mentioned at the outset, this prevents the locking element from being triggered prematurely by accidental touching of a single trigger element, and the spring element from thus being brought into the locking position, blocking automatic coupling of the plug as a result. By contrast, as a result of the flange arranged on the plug, when the plug is inserted into the connector all trigger elements are actuated simultaneously and the locking element is thus securely transferred into the locking position.

In an advantageous development, the locking element has at least one recess for engagement on a latch cam on an inner face of the connector.

In this case, in a particularly advantageous development, the trigger elements are formed by trigger flaps that are arranged on the locking element and preferably formed from the material of the locking element, and each have at least one trigger tab.

An advantageous embodiment is formed in that the locking element has a vertical limb and a horizontal limb and the trigger elements are arranged predominantly on the vertical limb. In this case, the horizontal limb has the at least one resiliently bent spring element, and at least one spring element acting in an axial direction is provided on the vertical limb.

In this case, in a particularly advantageous development, the at least one axially acting spring element cooperates, at the end face thereof, with a stop on the housing, in such a way that the horizontal limb does not protrude beyond an upper edge of the connector in the locking position.

An aperture comprising an extension is formed on the vertical limb of the locking element. In a particularly advantageous embodiment, this aperture is adapted to the external diameter of the plug, and the trigger elements that can be actuated by a flange of the plug protrude into the edge region of the aperture.

BRIEF DESCRIPTION OF THE DRAWINGS

Hereinafter, embodiments of the locking device are described in greater detail with reference to the drawings, in which.

DETAILED DESCRIPTION OF THE INVENTION

Figure 1:
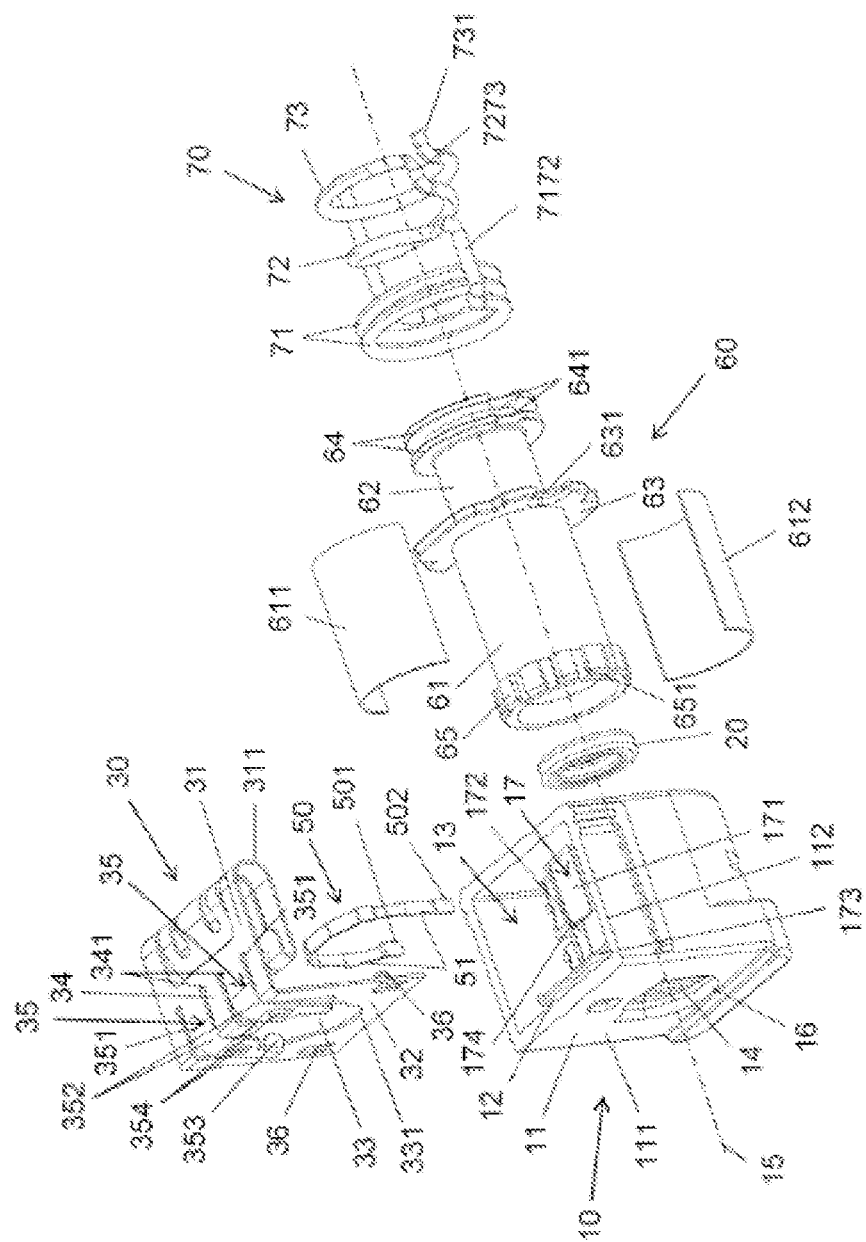
FIG. 1 is an exploded drawing of a locking device, comprising a locking element and a connector as well as a hose attachment connectable to the connector.

The exploded drawing of FIG. 1 shows a locking device comprising a locking element 30 for releasably fixing a fluid-conducting plug 40 (see FIG. 2) to a connector 10. The locking device comprises the connector 10 and the locking element 30. FIG. 1 further shows a locking clip 50, a hose attachment 60 comprising a heating unit 70, and a sealing ring 20.

The connector 10 consists of a housing 11, which has a front plate 111, comprising an interior 13. The housing 11 ends in an upward direction with a continuous upper edge 112. A hole 14 having a receiver 16 is formed in the front plate 111 coaxially with a longitudinal axis 15, which in the mounted state also forms the longitudinal axis of the plug 40 and of the hose attachment 60.

In the interior 13 of the housing 11, a projection 17 is formed. The projection 17 has a support face 171, a support web 172 that connects a wall 173 to the support face 171, and a groove 174. Between the projection 17 and the front plate 111, a vertical gap 12 is formed in the housing 11.

The locking element 30 is formed by a horizontal limb 31 comprising a downwardly bent spring element 311 and a vertical limb 32. The vertical limb 32 has an aperture 33 comprising an extension 331. On the horizontal limb 31, a latch element 34 is formed at the transition to the vertical limb 32, and a trigger element 35 is formed on either side of the latch element 34. The latch element 34 is separated from each adjacent trigger element 35 by two breaks 341 that are preferably punched out from the material of the locking element 30. Likewise, the trigger element 35 is separated from the remainder of each of the vertical limbs 32 and the horizontal limb 31 by a break 351 that is preferably punched out of the material of the locking element 30. Each trigger element 35 has a trigger flap 352, comprising a trigger tab 353 and a clearance 354. The trigger flaps 352 protrude into the aperture 33. The trigger tabs 353 of the trigger element 35 are formed approximately perpendicular to the trigger flaps 352, and extend diagonally downward toward the interior 13 of the housing 11. In a lower region of the vertical limb 32, two axial spring elements 36 that project with respect to the inner face of the connector 10 are preferably formed from the material of the locking element 30.

The substantially U-shaped, downwardly open locking clip 50 has two ends 501 and 502, which are formed slightly angled. Each limb of the locking clip 50 has a tab 51 above the ends 501 and 502. The tabs 51 are deformable under pressure, and, in effect as ice breakage protection, prevent this component from breaking or cracking if the hose attachment 60 expands as a result of the medium freezing solid.

The hose attachment 60 has a front portion 61 and a rear portion 62, the front portion 61 being delimited by a flange 65 having a plurality of grooves 651 and a flange 63. Around the front portion 61, a thermally conductive upper half-shell 611 and a thermally conductive lower half-shell 612 are arranged, which together form a thermally conductive sleeve and are formed for example from aluminum or an aluminum alloy. The rear portion 62 adjacent to the flange 63 is bordered off in a downward direction by a double flange 64. A recess 631 and a recess 641 are formed on the flange 63 and on the double flange 64 respectively.

The heating unit 70 is formed by a plurality of heating coils 71, 72, 73. The heating coil 71 is formed as a double loop and connected by a coil portion 7172 to the single-loop heating coil 72. This transitions via a coil portion 7273 into the likewise single-loop heating coil 73, the end of which is formed as a coil portion 731.

Figure 2:
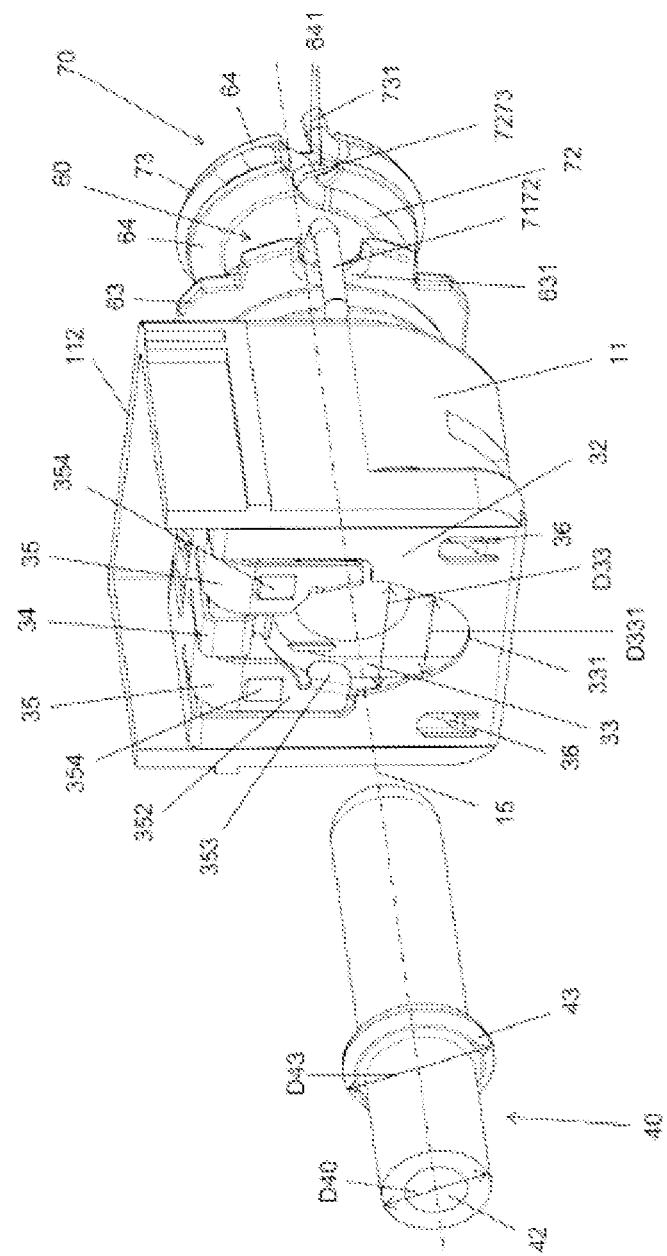
FIG. 2 is a perspective view of a locking element in a connector housing and of a plug that is not yet connected to the connector.

FIG. 2 shows the locking element 30 arranged in the interior 13 of the housing 11, a separate plug 40, and the heating unit 70 arranged on the hose attachment 60.

The plug 40 of a diameter D40 has a flange 43 of a diameter D43 greater than the diameter D40. The plug 40 is connected at the left end thereof to a hose (not shown). A fluid is passed through a hole 42 in the plug 40. Instead of the plug 40, an SAE socket (in accordance with SAE standard "SAE J2044"), as a fixed part on a customer tank or metering valve, can be coupled to the connector 10.

In this drawing, the locking element 30 is arranged on the projection 17 (see FIG. 1) in such a way that the vertical limb 32 engages in the gap 12 (see FIG. 1). The trigger elements 35, comprising the trigger flaps 352, the trigger tabs 353 and the clearances 354, as well as the latch element 34 and the axial spring elements 36, can be seen more clearly in the perspective view of FIG. 2.

The plug 40 is inserted along the longitudinal axis 15 into the aperture 33, comprising the extension 331, of the locking element 30. The diameter D43 of the flange 43 corresponds to a diameter D33 of the aperture 33, and the diameter D40 corresponds to a diameter D331 of the extension 331.

The heating unit 70 is arranged on the hose attachment 60. The two-loop heating coil 71 is arranged on the rear part, adjacent to the flange 63, of the front portion 61 of the hose connector 60 on the half-shells 611 and 612. The axially extending coil portion 7172 connecting the heating coil 71 to the heating coil 72 is arranged in the recess 631 of the flange 63. The coil portions 7273 and 731 are each arranged in one of the recesses 641 of the double flange 64, in such a way that the heating coils 73 are received by the intermediate space in the double flange 64. When the hose attachment 60 is mounted, the front portion 61 and the half-shells 611 and 612 enclosing it are arranged in the housing 11 of the connector 10. The purpose of the recesses 631, 641 is that the heating wire of the heating unit 70 cannot be caught when a protective cap is mounted. The flange 65 is positioned against the wall 173 of the projection 17, and the locking clip 50 secures the flange 65 against horizontal displacements by insertion into the groove 174. The tabs 51 provide an axial bias and a compensation option as a result of temperature-induced expansions of the hose attachment 60. The sealing ring 20 is arranged between the projection 17, an inner projection of the hose attachment 60 and the plug 40. In this context, four sealing lips ("X" or "quadro seal") are advantageously formed on the sealing ring 20.

Figure 3:
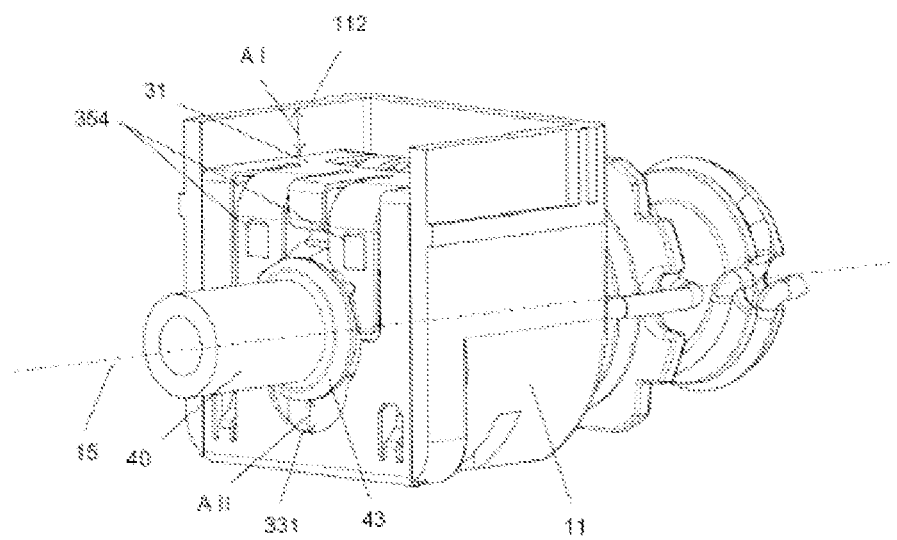
FIG. 3 is a perspective view of a locking element, in a connector housing and a plug, in a receiving position before the trigger elements are triggered.

In FIG. 3, the plug 40 is inserted into the locking element 30 along the longitudinal axis 15. The flange is arranged flush against an inner face of the vertical limb 32 of the locking element 30, the surface of the horizontal limb 31 and the upper edge 112 of the housing 11 forming a distance A I and the extension 331 forming a distance A II with the flange 43. The locking element 30 is latched in the housing 11 by engagement of the clearances 354 on latch cams 114 (see FIG. 6) arranged on the inner face 113 of the front plate 111, and in this drawing is located in a receiving position, in other words in an unlocked state. The at least one spring element 311 is under a sprung preload, and is positioned on the support face 171 of the projection 17 (see FIG. 1).

Figure 4:
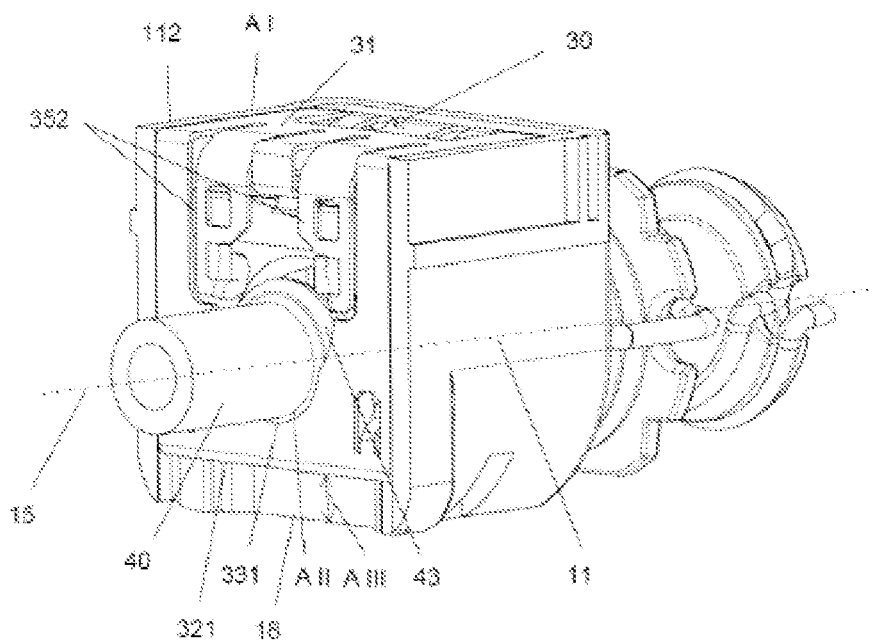
FIG. 4 is a perspective view of a locking element, in a connector housing and a plug, in a locking position.

FIG. 4 shows the locking element 30 in a locking position. The upper edge 112 of the housing 11 and the surface of the horizontal limb 31 are flush; in other words, the distance A I is zero. The same applies to the distance A II between the plug 40 and the extension 331. The lock is triggered by way of the contact of the flange 43 of the plug 40 with the trigger flaps 352. As a result, the clearances 354 are lifted off the latch cams 114. The locking element 30 snaps upward and clears a distance A III between a lower face 18 of the housing 11 and the lower edge 321 of the vertical limb 32. This distance A III corresponds to the distance A I in the unlocked state.

Figure 5:
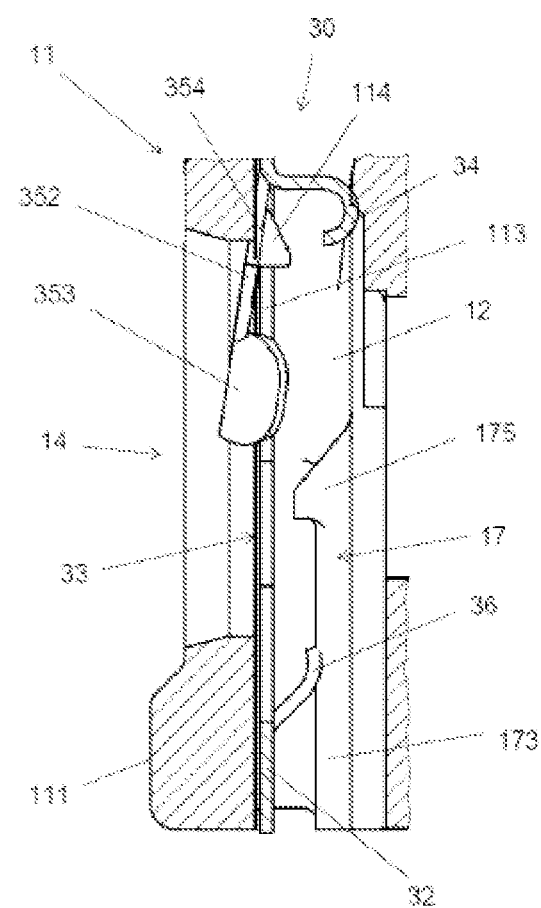
FIG. 5 is a partial sectional drawing of a housing and a locking element, comprising a trigger tab and a stop.

The detailed view of FIG. 5 is a section through the front plate 111 of the housing 11, part of the projection 17, and a region of the locking element 30. The vertical limb 32 is arranged in the gap 12 in the housing 11. A latch cam 114 is shown on the inner face 113, and engages in the clearance 354 in the locking element 30. A stop 175, against which the upper end face of the spring element 36 is positioned when the plug 40 is inserted, is formed on the projection 17. The axial spring element 36 additionally secures the locking element 30 against axial displacements and is positioned against the wall 173 of the projection 17.

Figure 6:
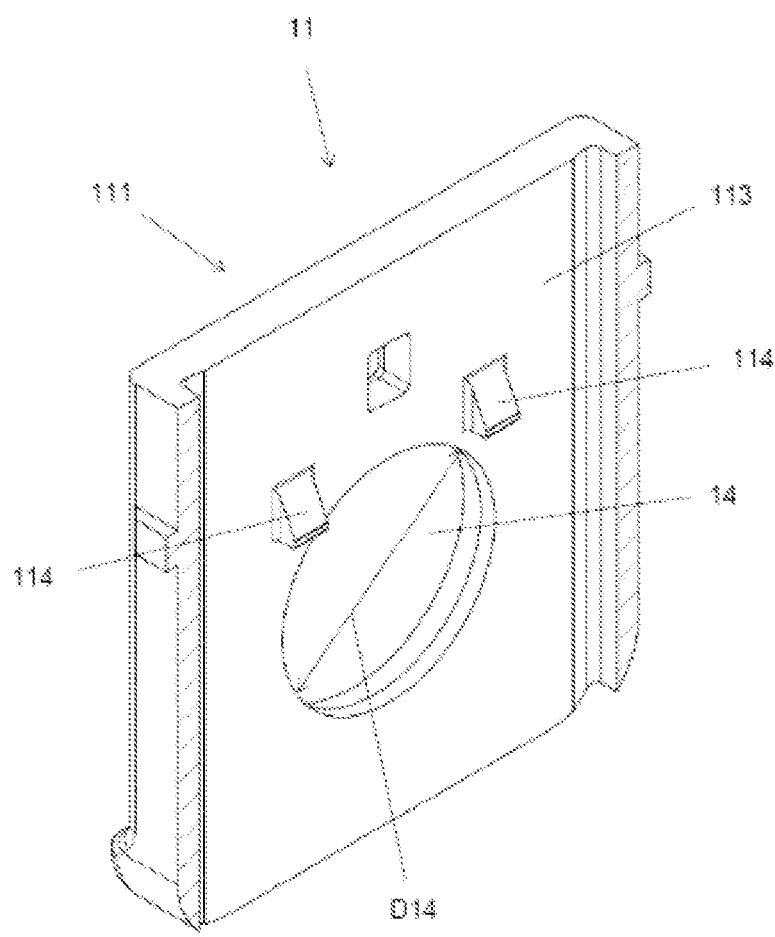
FIG. 6 is a perspective drawing of an inner wall of a connector housing comprising latch cams.

FIG. 6 shows the front plate 111 of the housing 11. On the inner face 113 of the front plate, latch cams 114 for receiving the clearances 354 are formed on either side of the hole 14. A diameter D14 of the hole 14 corresponds to that of the aperture D331.

The invention claimed is:

1. Locking device comprising a connector (10) and a locking element (30) for releasably fixing a fluid-conducting plug (40) to the connector (10), the locking element (30) having at least one spring element (311) for a sprung preload into a locking position with at least two trigger elements (35) for transferring from a receiving position into the locking position, characterized in that the at least two trigger elements (35) are provided on the locking element (30), the at least two trigger elements (35) are formed by trigger flaps (352) arranged on the locking element (30) in a sprung manner, each of the trigger flaps (352) has at least one trigger tab (353), and in that, for a transfer to the locking position, actuation of all the at least two trigger elements (35) are required, the locking element (30) has at least one clearance (354) for engagement on a latch cam (114) on an inner face (113) of the connector (10), the at least one trigger tab (353) are spring-biased on the locking element (30) in the unlocked state in an axial direction (15), the at least one trigger tab (353) are released in the axial direction (15) when actuated axially, the locking device is triggered by way of the contact a flange (43) located at plug (40) with the trigger flaps (352), as a result, the at least one clearances (354) are lifted off the latch cams (114), the locking element (30) further comprising a vertical limb (32) and a horizontal limb (31), the at least two trigger elements (35) being arranged on the vertical limb (32), and the horizontal limb (31) having the at least one resiliently bent spring element (311), and at least one spring element (36) acting in an axial direction is provided on the vertical limb (32).

2. Locking device according to claim 1, characterized in that the at least one spring element (36) cooperates with a stop (115) on the housing (11), in such a way that the horizontal limb (31) does not protrude beyond an upper edge (112) of the connector (10) in the locking position.

3. Locking device according to claim 2, characterized in that an aperture (33), comprising an extension (331) adapted to the external diameter (D40) of the plug (40), is formed on the vertical limb (32).

4. Locking device according to claim 3, characterized in that the at least two trigger elements (35) protrude into the edge region of the aperture (33) and can be actuated by a flange (43) on the plug (40).

5. Locking device according to claim 4, characterized in that each of the at least two trigger elements (35) is separated from the remaining part of the vertical limb (32) or of the horizontal limb (31) by a break (351) that is punched out of the material of the locking element (30).

6. Locking device according to claim 5, characterized in that a latch element (34) is formed on the horizontal limb (31), at the transition to the vertical limb (32), and one of the at least two trigger elements (35), respectively, is formed on either side of the latch element (34).

7. Locking device according to claim 6, characterized in that the trigger tabs (353) of the at least two trigger elements (35) are formed so as to be approximately at right angles to the trigger flaps (352).

* * * * *